(12) United States Patent
Tekneyan et al.

(10) Patent No.: US 10,760,571 B2
(45) Date of Patent: Sep. 1, 2020

(54) COUPLING ELEMENT FOR AN ECCENTRIC SCREW ROTOR

(71) Applicant: NETZSCH Pumpen & Systeme GmbH, Selb (DE)

(72) Inventors: Mikael Tekneyan, Kraiburg am Inn (DE); Philipp Nübl, Gras Bahnhof (DE); Stefan Weigl, Muehldorf am Inn (DE); Helmuth Weber, Simbach am Inn (DE); Markus Rosam, Aschau am Inn (DE)

(73) Assignee: NETZSCH Pumpen & Systeme GmbH, Selb (DE)

( * ) Notice: Subject to any disclaimer, the term of this patent is extended or adjusted under 35 U.S.C. 154(b) by 226 days.

(21) Appl. No.: 15/735,836

(22) PCT Filed: Jun. 9, 2016

(86) PCT No.: PCT/DE2016/000239
§ 371 (c)(1),
(2) Date: Dec. 12, 2017

(87) PCT Pub. No.: WO2016/198036
PCT Pub. Date: Dec. 15, 2016

(65) Prior Publication Data
US 2018/0180044 A1 Jun. 28, 2018

(30) Foreign Application Priority Data
Jun. 12, 2015 (DE) .................. 10 2015 007 567

(51) Int. Cl.
*F04C 15/00* (2006.01)
*F04C 2/107* (2006.01)

(52) U.S. Cl.
CPC .......... *F04C 15/0076* (2013.01); *F04C 2/107* (2013.01); *F04C 15/0073* (2013.01);
(Continued)

(58) Field of Classification Search
CPC .............. F04C 15/0073; F04C 15/0076; F04C 2230/21; F04C 2240/20; F04C 2240/805; F16D 1/0817; F16D 1/0847; F16D 1/0852
(Continued)

(56) References Cited

U.S. PATENT DOCUMENTS 2,146,766 A * 2/1939 Ricefield ................... F16D 3/74
464/91
5,195,880 A * 3/1993 Gruber
(Continued)

FOREIGN PATENT DOCUMENTS

| DE | 19943107 A1 | 4/2001 |
|---|---|---|
| DE | 10116641 A1 | 10/2002 |
| EP | 2669522 A1 | 12/2013 |

OTHER PUBLICATIONS

International Search Report & Written Opinion of the International Searching Authority Application No. PCT/DE2016/000239 Completed Date: Aug. 30, 2016; dated Sep. 8, 2016 9 pages.

*Primary Examiner* — Patrick Hamo
*Assistant Examiner* — Paul W Thiede
(74) *Attorney, Agent, or Firm* — Whitmyer IP Group LLC (57) ABSTRACT

A coupling element for connecting a helix-shaped eccentric screw pump rotor to a drive shaft, with a drive shaft receiving portion and a rotor connecting portion arranged at an opposite end of the coupling element from the drive shaft receiving portion, the rotor connecting portion is constituted as a hollow cylinder for receiving a rotor end of the screw pump rotor, wherein the hollow cylinder has at least two inner circumferential surfaces which are complementary to the rotor and have a radius which is fixed with respect to the cross-sectional center of the hollow cylinder.

15 Claims, 5 Drawing Sheets

(52) U.S. Cl.
CPC ...... *F04C 2230/21* (2013.01); *F04C 2240/20* (2013.01); *F04C 2240/805* (2013.01)

(58) Field of Classification Search
USPC .......................................... 418/153, 220, 48
See application file for complete search history.

(56) References Cited

U.S. PATENT DOCUMENTS

| | | | |
|---|---|---|---|
| 6,666,668 B1* | 12/2003 | Kaechele | F04C 2/1075 418/153 |
| 8,764,420 B2* | 7/2014 | Overmeier | F04C 15/0065 418/48 |
| 2012/0063941 A1* | 3/2012 | Overmeier et al. | F04C 15/0073 418/48 |

* cited by examiner

COUPLING ELEMENT FOR AN ECCENTRIC SCREW ROTOR

TECHNICAL FIELD

The invention relates to a coupling element for a helix-shaped eccentric screw pump rotor and a rotor connecting device with such a coupling element.

BACKGROUND

A coupling element for a helix-shaped eccentric screw pump rotor is known from document DE 199 43 107 A1. This document discloses a rotor, the helical shape whereof changes towards the one end, such that this end can be received by a coupling element. For this purpose, the coupling element has an internal profile complementary to the helix-shaped profile of the shaft end. A coupling between the rotor end and the coupling element thus takes place by means of an uninterrupted surface which is complementary to the rotor end. The rotor end is thus screwed into the coupling element in such a way that it is screwed along the helix-shaped inner wall surface up to the stop and is thereby guided along the helix-shaped inner wall surface of the coupling element. Rotating back or unscrewing of the rotor is prevented by means of a cross pin shown in FIG. 1, which forms a rotor stop at the opposite end of the rotor.

SUMMARY

The problem of the invention is to provide a coupling element for a helix-shaped eccentric screw pump rotor, which coupling element can easily be produced.

According to the invention, the problem is solved by a coupling element. It should be pointed out here that the embodiment of the rotor connecting portion according to the invention can also be used on coupling elements for eccentric screw pump rotors which do not have an articulated section for receiving a drive shaft end. Any element which is suitable for the rotational and detachable coupling of an eccentric screw pump rotor with a further component can be provided with the design of a rotor connecting portion according to the invention in order to achieve the advantages described in greater detail below.

As a result of the fact that the rotor connecting portion interior constituted as a hollow cylinder has at least two inner circumferential surfaces which are complementary to the rotor and have a radius which is fixed with respect to the cross-sectional center of the hollow cylinder, the entire inner circumferential surface of the hollow cylinder does not require precision machining, since the rotor end, when it is screwed in, comes into contact only with the two inner circumferential surfaces.

At least one surface section with a larger radius than the radius of the inner circumferential surfaces is advantageously provided between the inner circumferential surfaces. The surface section is preferably offset stepwise from the inner circumferential surfaces. Such a surface section, which is not used to guide the rotor end, offers a greater dimensional tolerance, as a result of which the coupling element can be produced by casting, without reworking being required.

Furthermore, the radius of the inner circumferential surfaces is preferably the smallest radius of the inner surfaces of the hollow cylinder, it can thus be ensured that the rotor end abuts only against the inner circumferential surfaces.

Moreover, it is advantageous that the inner circumferential surfaces are interrupted, so that a saving on material and more generous manufacturing tolerances can be achieved. Nub-like inner circumferential surfaces are thus advantageously formed, which run complementary to the rotor and can be produced particularly easily in the casting process, it is advantageous if the inner circumferential surfaces are reduced to three nubs in each case.

According to another advantageous development, at least one radial bore is provided in the casing of the hollow cylinder for receiving a securing element. Radial securing of a rotor end located in the hollow cylinder can thus be created, which prevents unscrewing of the rotor end out of the hollow cylinder.

It is particularly advantageous if the at least one radial bore is located opposite a surface section with an increased radius, as a result of which improved radial securing is achieved, because the rotor is pressed uniformly against the two inner circumferential surfaces. At least two radial bores are preferably present, which are spaced apart from one another axially and preferably also along the hollow cylinder casing circumference, as a result of which a further improved radial securing is achieved by different engagement points on the rotor. In this connection, at least one grub screw is preferably provided, which serves as a securing element, which is cost-effective and at the same can be inserted in the hollow cylinder in a space-saving manner. Such a grub screw is advantageously a grub screw with a tip, since tests have shown that a grub screw with a tip reliably prevents loosening of the connection of rotor end coupling element in a stop-start operation.

A further advantageous development makes provision such that the hollow cylinder is constituted divided in the longitudinal direction. Not only an axial, but also a radial disengagement of the rotor end from the coupling element is thus enabled.

The hollow cylinder is preferably constituted by two half shells, as a result of which the rotor end can be fastened by clamping, it is advantageous that the half shells are held together with at least two clamping screws, in order to apply a sufficiently great clamping force on the end of the rotor. It is particularly advantageous that the half shells are held together by three clamping screws, since tests have shown that three screws provide a better clamping force. In the clamped state of the half shells, a gap is preferably present between the half shells, which gap serves to secure the required clamping force.

Furthermore, the clamping element is advantageously developed such that its articulated section is constituted as a cardan joint receptacle. The coupling element can thus be constituted as a single element and connecting piece between the rotor and the cardan shaft.

An advantageous embodiment of the invention makes provision such that the coupling element is produced in one piece, preferably by a precision casting process without re-work, which is not only economical, but is also sufficiently precise thanks to the contact surfaces with respect to the rotor which are limited to the inner circumferential surfaces. In other words, more generous tolerances are possible in the production of the coupling element.

The rotor connecting portion advantageously has an end face recess for a sealing element, which can project into the interior of the hollow cylinder in order to be able thus to enter into a fluid-sealing contact with a rotor end introduced into the rotor connecting portion. It is advantageous that the sealing element can be an O-ring, which is favorable in production.

The invention also relates to a rotor connecting device, which comprises an eccentric screw pump rotor and a coupling element connected thereto as described above.

In particular, such a rotor connecting device comprises a rotor, which has a uniform helix shape over its entire length. Special machining of the rotor end for receiving the coupling element is thus no longer required and a finished rotor with a desired length can be produced as piece goods by simply cutting long rotor pieces to the desired length. Such long rotor pieces have for example a length of 6 m.

An advantageous rotor connecting device comprises a rotor end with at least one circumferential, radial bore for receiving the securing element. This bore is preferably formed conical. Such a bore facilitates the securing of the rotor end against rotating back or unscrewing.

Furthermore, an advantageous development of the previous rotor connecting devices consists in the fact that the rotor end rests only on the at least two inner circumferential surfaces of the coupling element, i.e. is only in contact with these inner circumferential surfaces in the circumferential direction. More generous and therefore cost-saving tolerances are thus possible in the manufacture of the coupling element.

A further rotor connecting device advantageously has a spring.

An advantageous development makes provision such that the rotor is connected to the coupling element by means of a spring washer. Moreover, the rotor end is advantageously provided with a notch or a locking bore, into which a catch fitted in the hollow cylinder can be introduced, as a result of which rapid and automatic securing of the rotor in the coupling element is achieved. Alternatively, rotor end 50a can be secured by means of a screw running eccentrically with respect to the cross-sectional center of the hollow cylinder from the side of the drive shaft receiving portion through the partition wall of the two sections. The securing thus takes place in a concealed and space-saving manner. Furthermore, it is advantageous that a rotor end located as far as the stop in the hollow cylinder comprises a radial cutout at a position before the end face of the hollow cylinder, into which cutout a securing element is introduced, which is additionally screwed to the end face of the hollow cylinder, as a result of which easily and readily accessible securing of the rotor to rotor connecting portion 10a is achieved.

BRIEF DESCRIPTION OF THE DRAWINGS

Examples of embodiment of the invention are explained in greater detail below with the aid of schematic drawings. In the figures.

DETAILED DESCRIPTION

Figure 1:
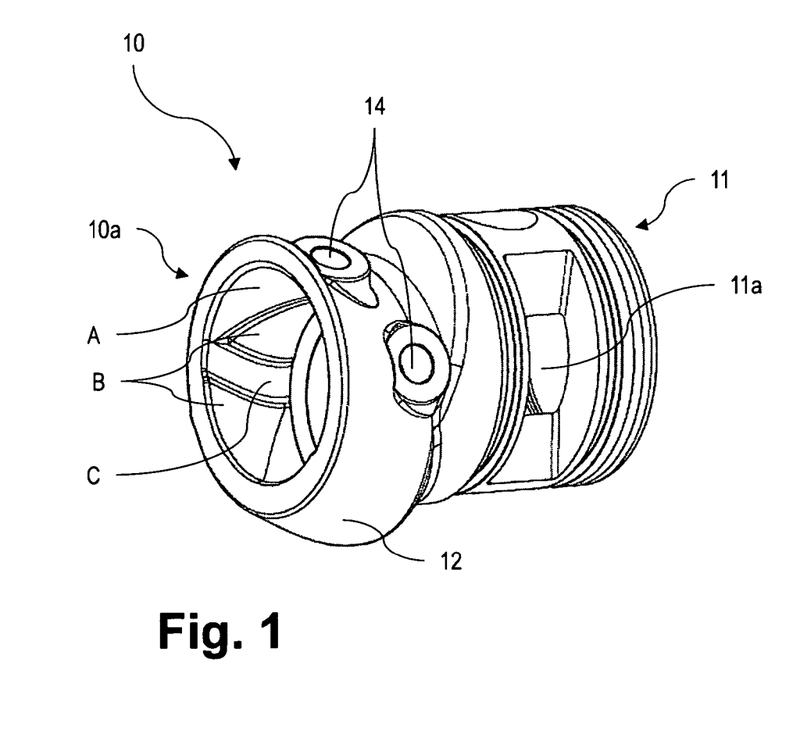
FIG. 1 shows a first example of embodiment of a coupling element according to the invention in a spatial representation.
Figure 2:
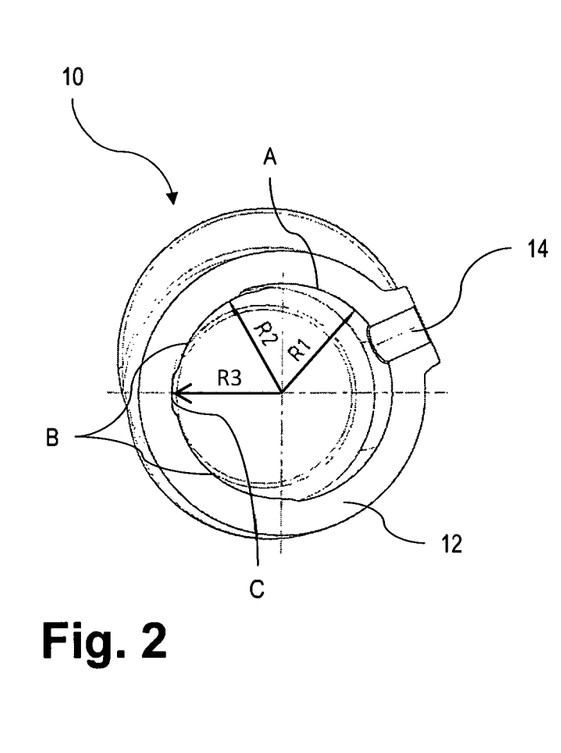
FIG. 2 shows a cross-section through the coupling element shown in FIG. 1 in the height of a hollow cylinder.
Figures 3, 4:
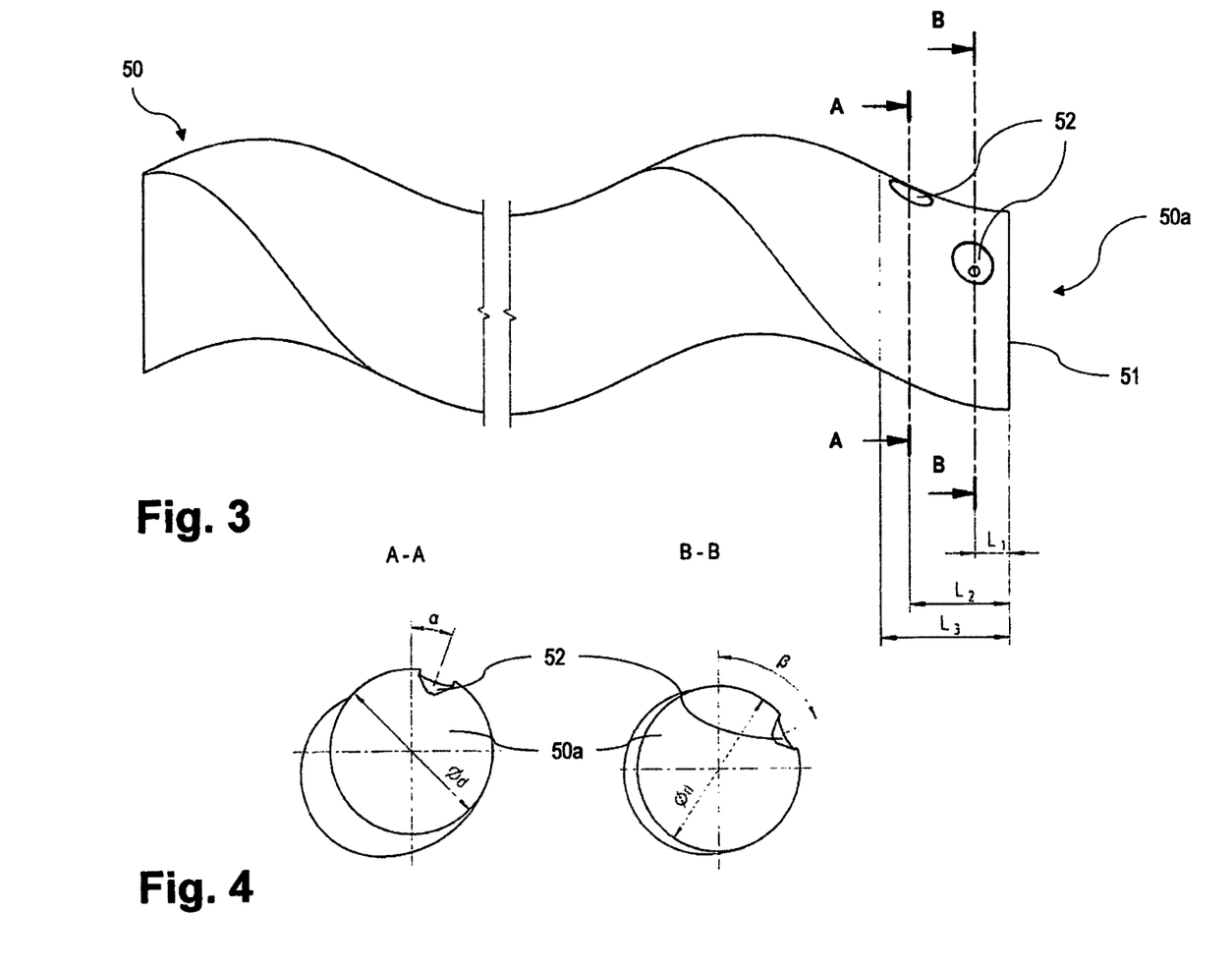
FIG. 3 shows a rotor with a rotor end fitting into the coupling element of the second example of embodiment in a side view.
FIG. 4 shows cross-sections A-A and B-B from FIG. 3.
Figures 7, 8:
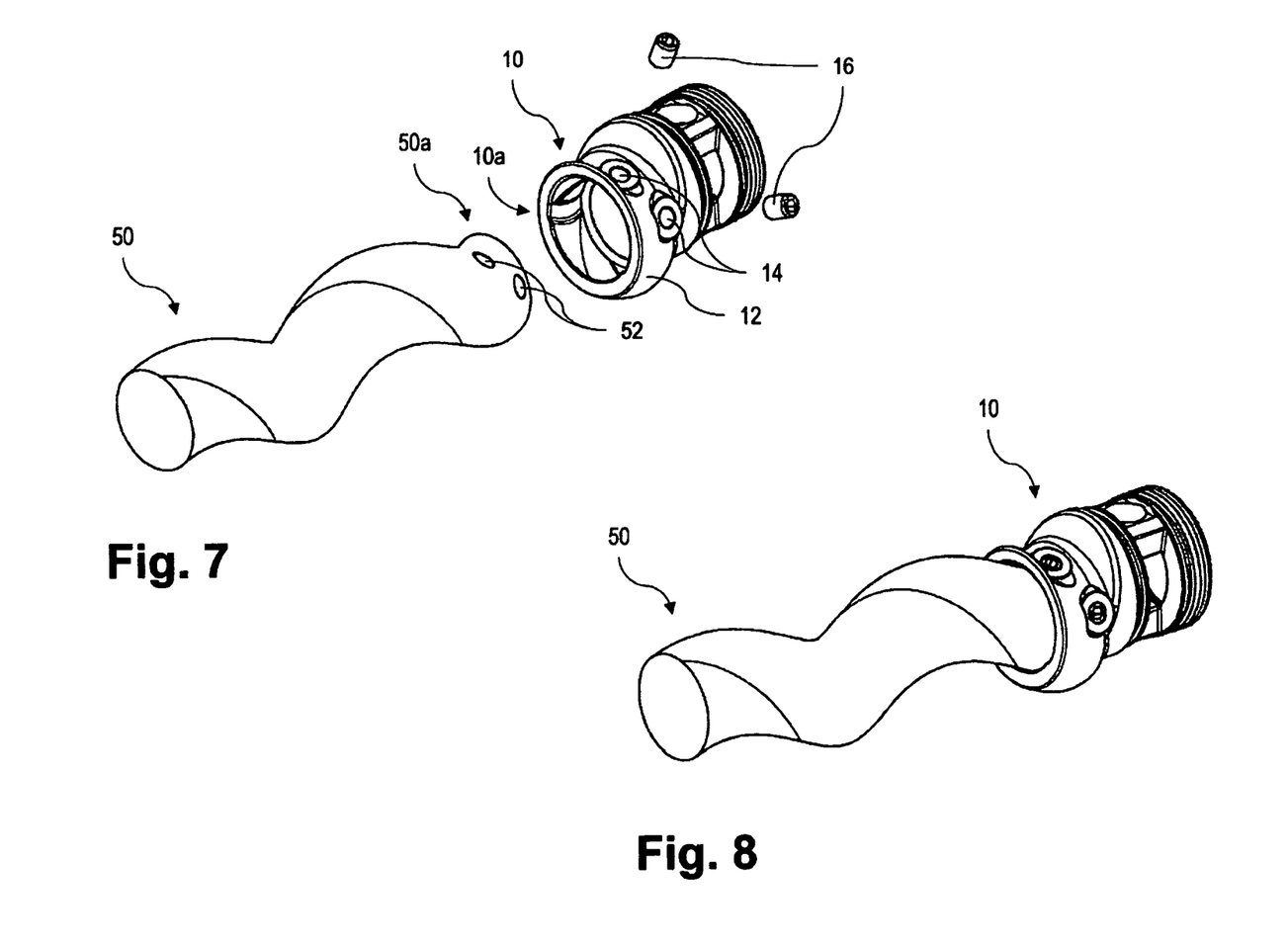
FIG. 7 shows the rotor connecting device from FIG. 5 in a spatial exploded view.
FIG. 8 shows the rotor connecting device from FIG. 5 in a spatial representation
Figure 9:
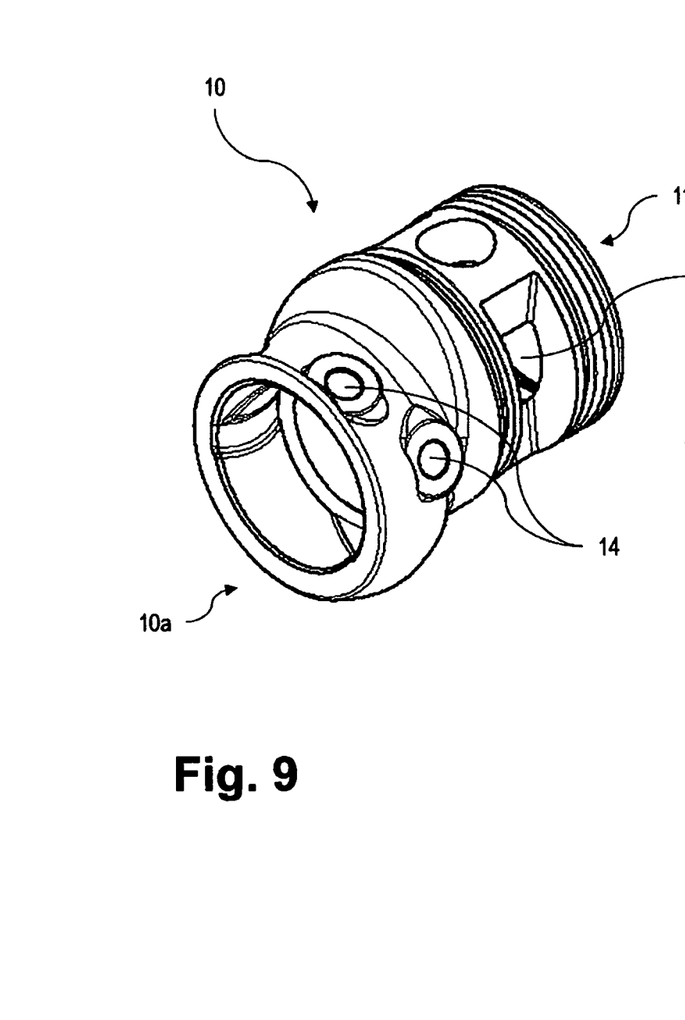
FIG. 9 shows the coupling element according to the first example of embodiment in a spatial representation.

FIGS. 1, 2 and 9 show a one-piece coupling element 10 produced by a precision casting process without rework, which comprises on the left-hand side (FIG. 1) a rotor connecting portion 10a and on the right-hand side (FIG. 1) a drive shaft receiving portion 11 constituted as an articulated section, which is constituted here as a cardan hinge receptacle 11a. Cardan hinge receptacle 11a in itself is known from the prior art and is not therefore described in greater detail below. Rotor connecting portion 10a represents a hollow cylinder 12 modelled on the helix-like corrugated form of an eccentric screw pump rotor 50 (FIGS. 3, 5, 7, 8). This hollow cylinder 12 comprises two inner circumferential surfaces B projecting inwards, which have a radius R2 fixed with respect to the cross-sectional center of hollow cylinder 12 (FIG. 2). These inner circumferential surfaces B run in the form of a helix in the longitudinal direction of coupling element 10 and thus form two inner circumferential surfaces B complementary to a matching rotor 50. The two inner circumferential surfaces B are spaced apart from one another by two surface sections A, C offset stepwise, which have a greater inner radius R1, R3 (FIG. 2) than radius R2 of inner circumferential surfaces B. Consequently, radius R2 of inner circumferential surfaces B is not only smaller than radius R1, R3 of the remaining inner wall surfaces inside surface sections A, C, but also the smallest radius of all the inner wall surfaces of hollow cylinder 12. Rotor connecting portion 10a can moreover comprise an end-face recess for an O-ring (not shown), which projects into the interior of hollow cylinder 12, in order thus to be able to enter into a fluid-sealing contact with a rotor end 50a introduced into rotor connecting portion 10a (FIGS. 3 and 7).

Coupling element 10, moreover, comprises two radial bores 14 passing through the casing of hollow cylinder 12 for receiving pointed grub screws 16 (FIG. 7). These radial bores 14 essentially lie opposite smallest surface section C, which provides an interruption between inner circumferential surfaces B, and are arranged here in the other surface section A between inner circumferential surfaces B. Hollow cylinder bores 14 are also spaced apart from one another axially and also along the hollow cylinder casing circumference.

FIG. 2 shows radius R2 of inner circumferential surfaces B as well as the two respective radii R1, R3 of surface sections A, C. Although inner radius R2 of inner circumferential surfaces B is selected the same here, inner circumferential surfaces B can also have different radii. The latter is essentially dependent on the geometry of eccentric screw pump rotor 50 to be received. In FIG. 2, it can also be seen that hollow cylinder bores 14 in the casing of hollow cylinder 12 are located opposite smallest surface section C, such that rotor 50 can be pushed against inner circumferential surfaces B by means of two grub screws (FIG. 7), which are screwed into hollow cylinder bores 14, in order in this way to prevent rotating back or unscrewing of rotor 50. The more generous tolerances in the manufacture of coupling element 10 are achieved as a result of the fact that surface section A lying opposite inner circumferential surfaces B, on account of its larger radius R1, allows rotor end 50a a tolerance margin. Thus, this tolerance margin is the spacing between rotor end 50a introduced into hollow cylinder 12 and surface section A. If inner circumferential surfaces B have a smaller radius R2 than required due to production-related reasons, rotor end 50a can nonetheless be introduced into hollow cylinder 12 on account of the tolerance margin, wherein it is then displaced in the representation of FIG. 2 to the right towards surface section A and utilizes the tolerance margin.

FIGS. 3 and 4 each show rotor end 50a, which differs from the rest of rotor 50 only in that two circumferential, conical bores 52 for receiving pointed grub screws 18 are provided. These bores 52 have axial spacings L1 and L2 from a rotor end face 51 (FIG. 3) and, in the circumferential direction, are offset by angle α and β with respect to a central, vertical cross-sectional axis (FIG. 4). A further possibility consists in connecting rotor end 50a to the coupling element by means of a spring washer (not shown). Alternatively, rotor end 50a can comprise a notch or a latching bore (not shown) into which a catch fitted in hollow cylinder 12 can be introduced instead of grub screws 16. Alternatively, rotor end 50a can be secured by means a screw (not shown) running eccentrically with respect to the cross-sectional center of hollow cylinder 12 from the side of drive shaft receiving portion 11 through the partition wall of the two sections 10a, 11. Furthermore, it is possible for a rotor end 50a located as far as the stop in hollow cylinder 12 to have a radial cutout (not shown) at a position before the end face of hollow cylinder 12, into which cutout a securing element (not shown) is introduced, which is additionally screwed to the end face of hollow cylinder 12. This securing element can be U-shaped and can be guided with its two legs through complementary circumferential cutouts at rotor end 50a and additionally screwed at the two legs and the connecting bridge to the end face of hollow cylinder 12, so that rotor 50 is axially secured. Alternatively, only a central bore (not shown) through rotor end 50a can be provided at the same position, through which bore a securing bolt projects radially and is screwed to the end face of hollow cylinder 12.

Figures 5, 6:
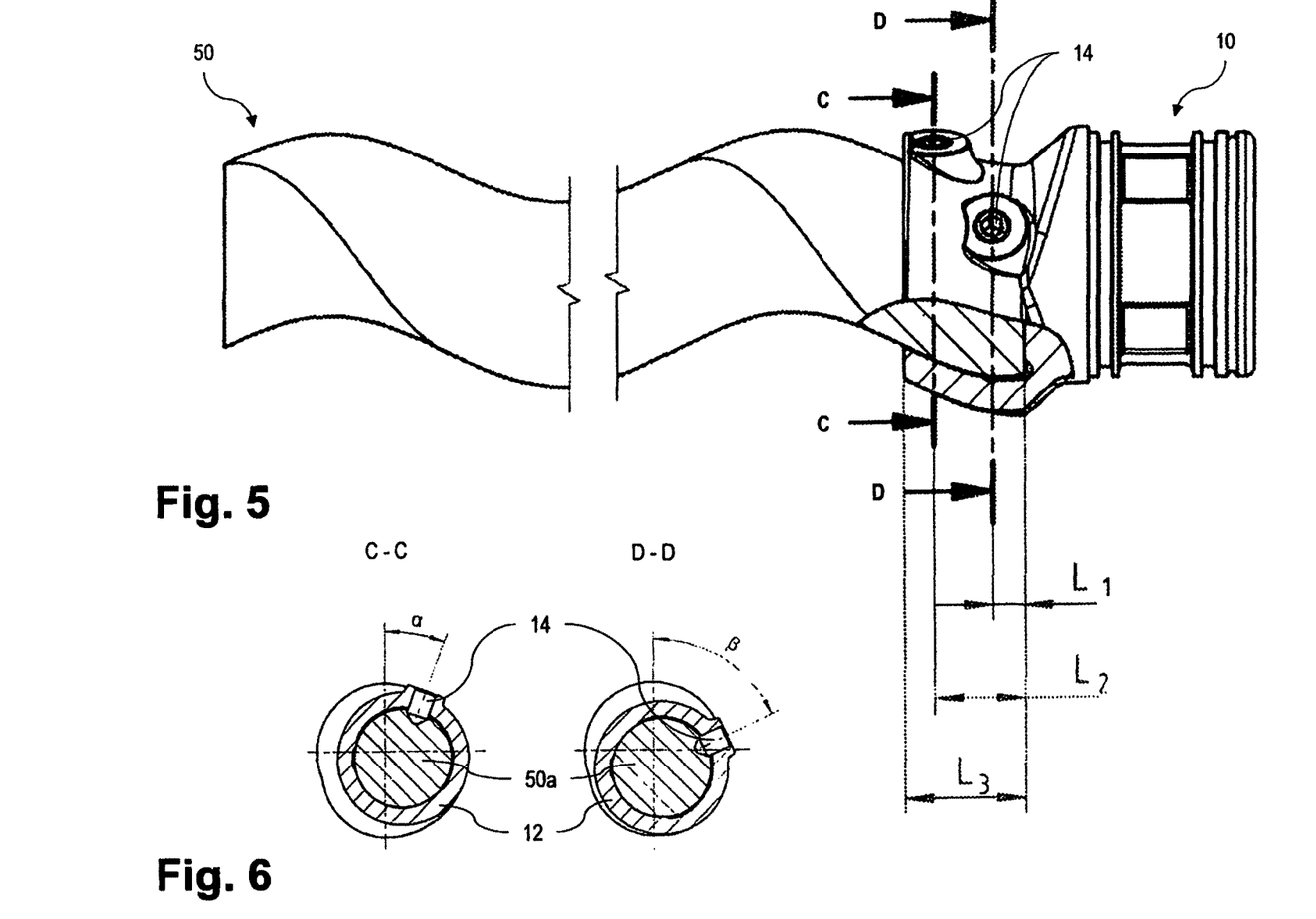
FIG. 5 shows a rotor connecting device with a coupling element according to the first example of embodiment in a side view.
FIG. 6 shows cross-sections C-C and D-D from FIG. 5.

FIGS. 5 and 6 show coupling element 10 from FIG. 1 mounted on rotor end 50a from FIGS. 3 and 4 and indicate that hollow cylinder bores 14 in hollow cylinder 12 are made to overlap with bores 52 during the assembly, such that pointed grub screws 16 can secure the two parts 10, 50 together in a torque-proof manner. Distances L1, L2 are also shown here, wherein a further distance L3 denotes the receiving depth of rotor end 50a in hollow cylinder 12.

FIGS. 7 and 8 show a rotor connecting device according to the invention with a coupling element 10 according to the invention, a rotor 50 and grub screws 16 in a dismantled (FIG. 7) and in an assembled (FIG. 8) state. Proceeding from FIG. 7, rotor 50 is screwed into hollow cylinder 12 of rotor connecting portion 10a of coupling element 10. Only when bores 52a lie coaxially with respect to hollow cylinder bores 14 are grub screws 16 completely countersunk, in order to produce the ready-assembled rotor connecting device (FIG. 8).

Figure 10:
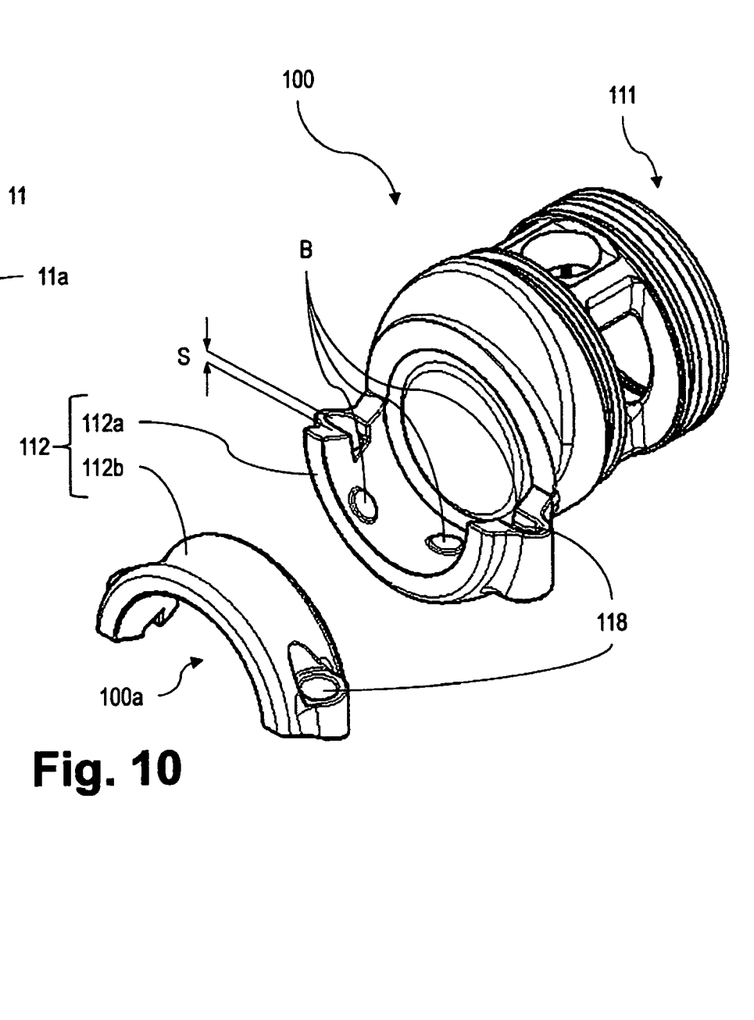
FIG. 10 shows a second example of embodiment of a coupling element according to the invention in a spatial representation

FIG. 10 shows, in contrast with coupling element 10 shown in FIG. 9, a second example of embodiment of a coupling element 100 according to the invention. Coupling element 100 in FIG. 10 comprises a rotor connecting portion 100a and a cardan hinge receptacle 111a, which does not differ from that of the first example of embodiment. Rotor connecting portion 100a comprises of a hollow cylinder 112, which is constituted divided in the longitudinal direction by means of two half shells 112a, 112b, wherein the one half shell 112a is in one piece with coupling element 100, while the other half shell 112b can be fitted to first half shell 112a by means of clamping screws (not shown). For this purpose, cylindrical receiving holes 118 are provided at both ends of each half shell 112a, 112b. As soon as half shells 112a, 112b surround a rotor end 50a (not shown), their respective receiving holes 118 are brought into an aligned overlap, so that the clamping screws can be passed through in order thus to clamp rotor end 50a torque-proof between them. A gap S remains between the two half shells 112a, 112b, which enables the required clamping force. The clamping force is of a magnitude such that unscrewing of rotor end 50a is prevented due to the frictional locking between rotor end 50a and inner circumferential surfaces B of half shelves 112a, 112b. Inner circumferential surfaces B are interrupted in this example of embodiment, so that they form nub-like inner circumferential surfaces B, which run complementary to the rotor (not shown), wherein each inner circumferential surface B is reduced in each case to three nubs B. Nubs B which are aligned in a complementary manner to a rotor can also replace inner circumferential surfaces B of the first example of embodiment.

What is claimed is:

1. A coupling element for connecting a helix-shaped eccentric screw pump rotor to a drive shaft, comprising:
   a drive shaft receiving portion, and
   a rotor connecting portion arranged at an opposite end of the coupling element from the drive shaft receiving portion,
   the rotor connecting portion is constituted as a hollow cylinder for receiving a rotor end of the screw pump rotor,
   wherein the hollow cylinder has at least two inner circumferential surfaces which are complementary to the rotor and have a radius which is fixed with respect to the cross-sectional centre of the hollow cylinder,
   wherein at least one surface section with a larger inner radius than the radius is present between the inner circumferential surfaces.

2. The coupling element according to claim 1, wherein the radius of the inner circumferential surfaces is the smallest radius of the inner surfaces of the hollow cylinder.

3. The coupling element according to claim 1, wherein at least one radial bore is provided in a casing of the hollow cylinder for receiving a securing element.

4. The coupling element according to claim 1, wherein the hollow cylinder is divided in the longitudinal direction.

5. The coupling element according to claim 1, wherein its drive shaft receiving portion is constituted as a cardan hinge receptacle.

6. The coupling element according to claim 1, wherein the rotor connecting portion is a casting without additional machining.

7. The coupling element according to claim 1, wherein the radius of the inner circumferential surfaces is the smallest radius of the inner surfaces of the hollow cylinder.

8. The coupling element according to claim 1, wherein at least one radial bore is provided in a casing of the hollow cylinder for receiving a securing element.

9. The coupling element according to claim 1, wherein the hollow cylinder is divided in the longitudinal direction.

10. The coupling element according to claim 1, wherein the drive shaft receiving portion is constituted as a cardan hinge receptacle.

11. The coupling element according to claim 1, wherein the rotor connecting portion is a casting without additional machining.

12. A rotor connecting device, comprising:
a helix-shaped eccentric screw pump rotor, and
a coupling element for connecting the helix-shaped eccentric screw pump rotor to a drive shaft, having a drive shaft receiving portion and a rotor connecting portion arranged at an opposite end of the coupling element from the drive shaft receiving portion,
the rotor connecting portion is constituted as a hollow cylinder for receiving a rotor end of the screw pump rotor,
wherein the hollow cylinder has at least two inner circumferential surfaces which are complementary to the rotor and have a radius which is fixed with respect to the cross-sectional centre of the hollow cylinder
wherein at least one surface section with a larger inner radius than the radius is present between the inner circumferential surfaces.

13. The rotor connecting device according to claim 12 wherein a helix shape of the rotor is uniform over its entire length.

14. The rotor connecting device according to claim 13, wherein the rotor end rests only on the inner circumferential surfaces of the coupling element.

15. The rotor connecting device according to claim 12, wherein the rotor end rests only on the inner circumferential surfaces of the coupling element.

* * * * *